(12) United States Patent
Nagamine et al.

(10) Patent No.: US 7,921,074 B2
(45) Date of Patent: Apr. 5, 2011

(54) INFORMATION PROCESSING SYSTEM AND INFORMATION PROCESSING METHOD

(75) Inventors: Takeshi Nagamine, Kanagawa (JP); Yutaka Andoh, Kanagawa (JP); Kengo Omura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 992 days.

(21) Appl. No.: 11/341,373

(22) Filed: Jan. 30, 2006

(65) Prior Publication Data

US 2007/0043719 A1    Feb. 22, 2007

(30) Foreign Application Priority Data

Aug. 16, 2005    (JP) ................... 2005-236177

(51) Int. Cl.
*G06F 7/00*    (2006.01)

(52) U.S. Cl. .............. 707/607; 709/204; 709/206

(58) Field of Classification Search .......... 707/607; 709/206, 204
See application file for complete search history.

(56) References Cited

U.S. PATENT DOCUMENTS

| | | | |
|---|---|---|---|
| 5,363,507 A | | 11/1994 | Nakayama et al. |
| 5,565,911 A | * | 10/1996 | Ishikawa et al. ........... 348/14.08 |
| 2003/0145052 A1 | * | 7/2003 | Watanabe .................... 709/204 |
| 2003/0187632 A1 | * | 10/2003 | Menich ........................... 704/1 |
| 2003/0197731 A1 | | 10/2003 | Chiu et al. |
| 2004/0168172 A1 | | 8/2004 | Masuda |
| 2005/0091191 A1 | * | 4/2005 | Miller et al. ...................... 707/1 |
| 2005/0228861 A1 | * | 10/2005 | Nagayama et al. ............ 709/204 |
| 2008/0147687 A1 | * | 6/2008 | Furukawa et al. ............. 707/100 |

FOREIGN PATENT DOCUMENTS

| | | |
|---|---|---|
| JP | A-04-095450 | 3/1992 |
| JP | A 06-195343 | 7/1994 |
| JP | A 2002-251405 | 9/2002 |
| JP | A-2004-030623 | 1/2004 |
| JP | A-2004-046799 | 2/2004 |
| JP | A-2004-258802 | 9/2004 |

OTHER PUBLICATIONS

Oct. 12, 2010 Office Action issued in Japanese Patent Application No. 2005-236177 (with translation).

* cited by examiner

*Primary Examiner* — Charles Rones
*Assistant Examiner* — Belix M Ortiz
(74) *Attorney, Agent, or Firm* — Oliff & Berridge, PLC

(57) ABSTRACT

An information processing system includes a recognition portion that recognizes a document shown in a given space, a detection portion that detects an event occurring in the given space, and an index-giving portion that gives information on the event detected by the detection portion to the information on the document recognized by the recognition portion, as an index for search.

9 Claims, 16 Drawing Sheets

FIG. 2

ID: 0014, DATE 20050210, PLACE: 11, MEMBER; A;E;F;G, DEVICE: T, TIME 10:34:00-11:55:45

ID: 0015, DATE 20050212, PLACE: 12, MEMBER: A;B;D, DEVICE: Y, TIME 13:51:00-15:12:30

ID: 0016, DATE 20050214, PLACE: 11, MEMBER; A;C;G;J, DEVICE: Z, TIME 14:02:12-14:57:25
DOCUMENTS: http://www.f.co.jp/meeting/stored/0016/outline.html,
http://www.f.co.jp/meeting/stored/0016/plan.html,
http://www.f.co.jp/meeting/stored/0016/info.txt
OPERATION STATE:
00:00:00 | A:132 | C:000 | G:000 | Z:035;
00:00:01 | A:132 | C:000 | G:056 | Z:035;
00:00:02 | A:032 | C:000 | G:056 | Z:035;
00:00:03 | A:032 | C:000 | G:056 | Z:035;
00:00:04 | A:032 | C:000 | G:055 | Z:035;
00:00:05 | A:032 | C:000 | G:055 | Z:035;
00:00:06 | A:032 | C:000 | G:054 | Z:135;
00:00:07 | A:032 | C:012 | G:044 | Z:135;
⋮
⋮

FIG. 16

```
ID: 0020, DATE 20050219, PLACE: 11, MEMBER; A;E;F;G, DEVICE: T, TIME 16:12:30-
16:54:44
   ID: 0021, DATE 20050221, PLACE: 12, MEMBER; A;B;D  DEVICE: Y, TIME 10:50:32-
   12:08:35
      ID: 0022, DATE 2005024, PLACE: 11, MEMBER; A;B;C;G;, DEVICE: Z, TIME 13:21:12-
      14:50:02
      DOCUMENTS: http://www.f.co.jp/meeting/stored/0016/outline.html
      http://www.f.co.jp/meeting/stored/0016/plan.html
      http://www.f.co.jp/meeting/stored/0016/info.txt
      OPERATION STATE:
      00:00:00 | A:132 | B:000 | C:020 | G:056 | Z:035;
      00:00:01 | A:132 | B:000 | C:031 | G:056 | Z:035;
      00:00:02 | A:032 | B:003 | C:031 | G:056 | Z:035;
      00:00:03 | A:032 | B:013 | C:031 | G:056 | Z:035;
      00:00:04 | A:032 | B:023 | C:031 | G:055 | Z:035;
      00:00:05 | A:032 | B:033 | C:031 | G:055 | Z:035;
      00:00:06 | A:032 | B:033 | C:031 | G:054 | Z:135;
      00:00:07 | A:032 | B:033 | C:031 | G:044 | Z:135;
       :
       :
```

FIG. 17

| 2, 1 | 3, 1    | 4, 1 |
|------|---------|------|
| 2, 2 | A(3, 2) | 4, 2 |
| 2, 3 | 3, 3    | 4, 3 |

FIG. 18

| 2, 0 | 3, 0 | 4, 0 |
|------|------|------|
| 2, 1 | 3, 1 | 4, 1 |
| 2, 2 | A(3, 2) | 4, 2 |
| 2, 3 | 3, 3 | 4, 3 |

INFORMATION PROCESSING SYSTEM AND INFORMATION PROCESSING METHOD

BACKGROUND OF THE INVENTION

1. Field of the Invention

This invention relates to an information processing system and information processing method.

2. Description of the Related Art

Conventionally, there has been proposed a technique for searching for a document. Character strings included in the document to be searched for are divided in advance to create indexes. With the indexes, it is possible to access the document at a high speed. Other patent documents are also proposed to search for a document as follows.

Japanese Patent Application Publication No. 6-195343 (hereinafter, referred to as Document 1) describes a technique, with which the user is freely able to give attributes to documents for a subsequent search and classify the documents into categories. Japanese Patent Application Publication No. 2004-251405 (hereinafter, referred to as Document 2) describes a technique for recording the situation where the document was used, by listing participants' names and date of the conference in which the document was used, when the document is stored.

Even by use of the technique of searching for a document after the indexes are added to the document to be searched for, the document, however, cannot be searched for, unless the character string included in the document can be remembered properly. Even if the character string included in the document can be remembered properly, a large amount of search results will be burdens for the user, if there are so many documents that include the character string.

If a document to be searched for is limited to that used in the meeting, there are some cases where the document should be specified with the situation where the document was used. For instance, in searching for the material used in delivering the presentation to the president, it is preferable to specify that the user and the president attended the meeting, or other members attended the meeting, positions of the participants, date, and the document in the conference room. For example, the participants and the document used in the conference may be stored as the context information so that the user can view the context information and access the detailed information while remembering the contents of the conference. However, in this case, if the context information of the conference to be viewed is increased, there is the problem in that it takes time for the user to find the information to be needed.

Document 1 does not especially describe the names or the positions of the participants who attended the conference. Even if the participants' names or the positions thereof are given as attributes, it will take time to categorize and view the attributes in order to find the information. Also, Document 2 records the situation where the document was used when the document is stored, yet does not mention the search by use of the information.

SUMMARY OF THE INVENTION

The present invention has been made in view of the above circumstances and provides an information processing system and information processing method that can search for a document even if the user cannot remember the content of the document accurately.

According to one aspect of the present invention, there is provided an information processing system including: a recognition portion that recognizes a document shown in a given space; a detection portion that detects an event occurring in the given space; and an index-giving portion that gives information on the event detected by the detection portion to the information on the document recognized by the recognition portion, as an index for search. In accordance with the present invention, it is possible to search for a document by reconstructing the situation when the document that the user likes to search for was used, allowing the user to search for the document, even if the user cannot remember the content of the document accurately.

According to another aspect of the present invention, there is provided an information processing system including: a memory portion that stores information on an event occurring in a given space in association with a document used in the given space as an index for search; a receiving portion that receives the information on the event as a search request: and a search portion that searches the memory portion for the document on the basis of the search request received by the receiving portion. In accordance with the present invention, a document can be searched for by restructuring the situation when the document that the user likes to search for was used. It is therefore possible to search for the document, even if the user cannot remember the content of the document precisely.

According to a further aspect of the present invention, there is provided an information processing method including: recognizing a document shown in a given space; detecting an event occurring in the given space; and giving information on the event detected to the information on the document recognized, as an index for search.

According to a further aspect of the present invention, there is provided an information processing method including: receiving information on an event occurring in a space as a search request; searching for a document on the basis of the search request received from a memory portion in which the document used in the space is stored in association with the information on the event as an index for search; and displaying a search result.

BRIEF DESCRIPTION OF THE DRAWINGS

Embodiments of the present invention will be described in detail based on the following figures, wherein:

FIG. 2 is a view showing a data structure in conference DB;

FIG. 16 is a view showing yet another data structure of the conference DB; and

FIG. 17 and FIG. 18 are views illustrating a proximity determination made by the search portion.

DESCRIPTION OF THE EMBODIMENTS

Figure 1:
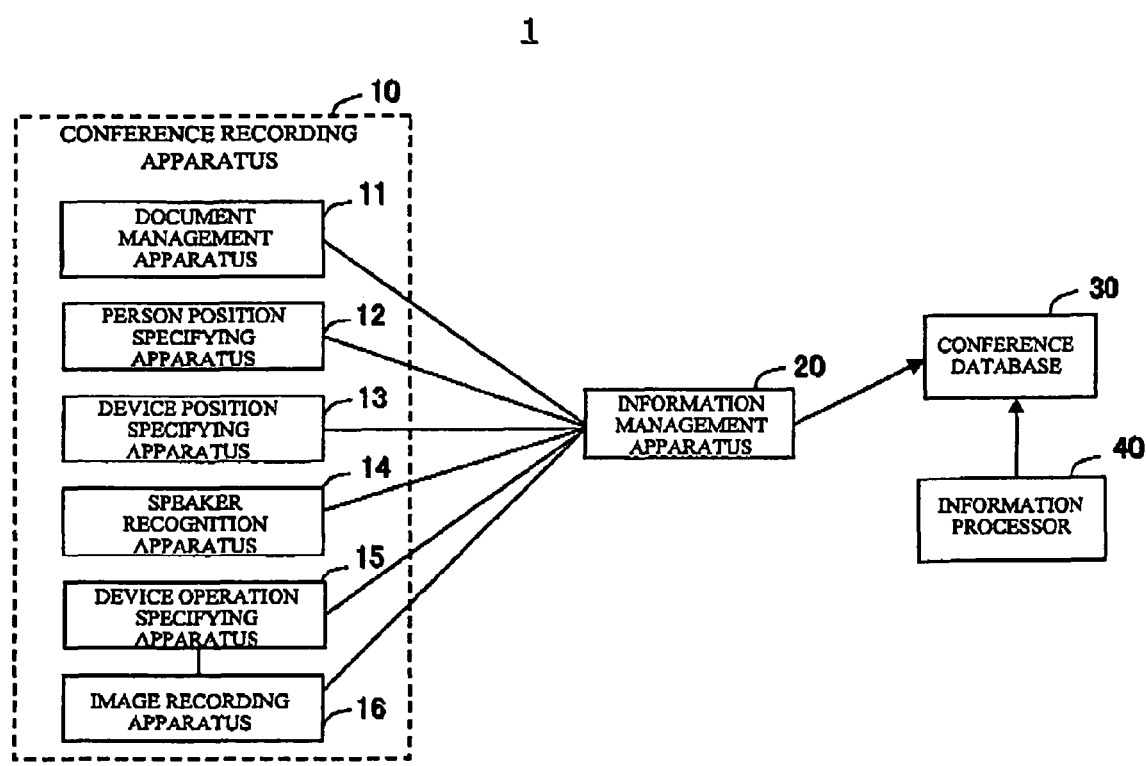
FIG. 1 is a view showing a whole configuration of an information processing system in accordance with the present invention.

A description will now be given, with reference to the accompanying drawings, of embodiments of the present invention. FIG. 1 is a view showing a whole configuration of an information processing system in accordance with the present invention. As shown in FIG. 1, an information processing system 1 includes a conference recording apparatus 10, an information management apparatus 20, and a conference database (DB) 30. The conference recording apparatus 10 records the information on the conference. The information management apparatus 20 and the conference database (DB) 30 manage and control the information on the conference stored in the conference recording apparatus 10. The conference recording apparatus 10 includes a document management apparatus 11, a person position specifying apparatus 12, a device position specifying apparatus 13, a speaker recognition apparatus 14, a device operation specifying apparatus 15, and an image recording apparatus 16. In a description hereafter, an object includes a person, device, and equipment that are existent in a space. A conference room will be exemplarily described as the afore-mentioned space.

The conference recording apparatus 10 is provided for each conference room, and starts recording the conference in the conference room by giving an instruction of start of recording. A conference room ID is assigned to the conference recording apparatus 10 to recognize the record as a record of which conference room. The document management apparatus 11 controls and manages the document used in each conference, and has capabilities of recognizing the document shown in the space. The document management apparatus 11 is composed of, for example, hardware or software that captures an image of the document projected by a projector and a projection period thereof, software that records a file name of a slide document and title of each page together with the time, software that records accessed URL (Uniform Resource Locator) and the accessed time, or the like. More specifically, the document management apparatus 11 is composed of software that monitors a slide being displayed on a personal computer connected to the projector or software that monitors opening and closing of the document file.

What can be considered as the type of document stored in the conference DB 30 is a slide (power point), text document, Web document, captured image of a whiteboard, photo taken on the conference, and the like. Images of these documents may be captured manually and registered together with the displayed times in the conference DB 30, or may be registered automatically. If the images are automatically registered, the document management apparatus 11 may recognize, for example, a changeover of the slide on the PC connected to the projector, the opening of the text document, and the changeover of the URL on a Web browser, so as to capture the screen image of the PC or the software in each time. Then, the image and the time while the image is being displayed are registered in the conference DB 30. Also, the image of a photo or whiteboard is recorded as a row in a record that corresponds to the time that captured the image. The method of storing the document may be made with an image that was captured, or may be the document itself. Also, the URL of the document managed and controlled on the Web can be stored to follow the link and access the document.

The person position specifying apparatus 12, the device position specifying apparatus 13, the speaker recognition apparatus 14, and the device operation specifying apparatus 15 serve as a detection portion that detects any event that occurs in the space. A description will be given in the following in detail. The person position specifying apparatus 12 detects an existence of a person that is an object existent in the conference room and a position of the person as events. For instance, the person position specifying apparatus 12 specifies and stores positional information of the participants that changes with the time in the conference room during the conference. The person position specifying apparatus 12, for example, utilizes IC tags (RFID tag) to specify the positions of the participants in the conference room. The person position specifying apparatus 12 is composed of the IC tags that store person IDs and a reader that reads the person IDs from the IC tags. Individuals respectively carry with themselves an ID card in which the IC tag is embedded. An IC tag records a person ID that can specify an individual.

Multiple readers are embedded on the floor or the wall of the conference room to read the afore-mentioned person ID. For instance, on the floor of the conference room, the reader is embedded in the center of lattice-shaped segments. A diagonal distance of the lattice-shaped segments is dependent on a communications method in use for the communication between the IC tags and the readers, for example, directional characteristics and communication-enable distance. It is desirable to cover the whole floor, if possible, without interfering with each other. The reader provided for each segment reads the person ID from the IC tag existent in a readable range thereof. There are some cases where an IC tag is read by multiple readers. The person ID that has been read and a reader ID that represents the reader are sent to the information management apparatus 20.

The reader may be installed on the desk as a method of recognizing a position. By installing the readers on the positions to face the desks, it is possible to recognize the position of the person sitting around the desk. It is also possible to understand on which position of the desk the person is situated. It is also possible to use together with the readers arranged in the above-mentioned lattice-shaped segments.

The device position specifying apparatus 13 detects and stores the existence of the devices and facilities and positions thereof in the conference room. Here, the device position specifying apparatus 13 employs the same mechanism as that of the person position specifying apparatus 12. However, instead of the above-mentioned person IDs, the IC tags that store the device IDs are applied to the devices and facilities that have possibilities of moving. The devices include, for example, a projector, PC, and the like. The facilities may include, for example, a movable whiteboard, table, chair, desk, and the like.

The speaker recognition apparatus 14 detects a remark state of a person as an event. The speaker recognition apparatus 14 recognizes and stores the speaker of the remark in each time during the conference. The ID card that is carried by each individual internally includes a small-sized microphone and a writing device. The speaker recognition apparatus 14 includes a circuit that turns on a remark flag showing the IC tag that there is a remark, if there is a remark stronger than a given strength. The speaker recognition apparatus 14 is capable of reading the person ID and the remark flag in an on state with the use of the reader, in the same manner as the person position specifying apparatus 12. The person ID, the reader ID, and the remark flag are transmitted to the information management apparatus 20.

The device operation specifying apparatus 15 detects an operation state of the device as an event. The device operation specifying apparatus 15 specifies and stores the operation of the slide or other devices during the conference. The device operation specifying apparatus 5 monitors the states of various devices installed in the conference room. For instance, the device operation specifying apparatus 15 monitors on/off of the power of the projector lamp or the light, and sends the change in the state to the information management apparatus 20. The image recording apparatus 16 is composed of, for example, a camcorder, and sends the video image being recorded to the information management apparatus 20.

The information management apparatus 20 has capabilities of giving an index to the information on the document recognized by the document management apparatus 11, as an index for searching for the information of the event that has been detected. The information management apparatus 20 serves as an index-giving portion. In processing the start and end of the conference, the user gives an instruction to the conference recording apparatus 10 to start recording the conference. The information management apparatus 20 makes an inquiry to the conference DS 30 to obtain a new conference ID, when the state is a start, and then a pair of the conference ID and the conference room (a conference ID list) is stored in the information management apparatus 20. The conference ID list stores the name and ID of the conference that is currently being held. Next, the information management apparatus 20 creates a new record in the conference DB 30, and stores therein the conference ID, conference name, date, and time. At this time, the information management apparatus 20 sends the date and start time to the conference DB 30 to store them therein. The user gives an instruction of the end of the conference to the conference recording apparatus 10 to finish recording. The conference recording apparatus 10 sends the conference room name and the state of end to the information management apparatus 20. The information management apparatus 20 acquires the corresponding conference ID from the conference ID list and stores the end time (or also stores a period of the conference). The information management apparatus 20 deletes the corresponding conference room name and conference ID from the conference ID list.

The information management apparatus 20 refers to the ID list, searches for the conference ID with the conference room name, and stores the video image in the record that corresponds to the conference ID that has been searched for. The video image may be stored successively, yet may be stored in a digital videotape or the like in the image recording apparatus 16 at first and then stored in the conference DB 30 after the conference.

In processing on the person position specifying apparatus 12 and the speaker recognition apparatus 14 to record the conference, a remark of the person who carries an ID card with himself or herself is detected by use of a microphone installed in the ID card. When the remark is detected, the writing device turns on the remark flag of a wireless IC tag embedded in the ID card. When the remark is not detected, the writing device turns off. The person ID is recorded in the wireless IC tag to specify the person, and is read by the reader. Here, the wireless method specified in ISO15693 is employed. The reader sends the person ID that has been read, the remark flag, the reader ID thereof, and the conference room name in which the reader is installed, to the information management apparatus 20. The information management apparatus 20 obtains the person's name by using a person ID conversion list and the conference ID by using the conference ID list. The information management apparatus 20 sends the afore-described information to the conference DB 30. Here, the reader is configured to read the information every second.

In addition, a description of the device position specifying apparatus 13 will be omitted, because the device position specifying apparatus 13 is capable of utilizing the same method as that of the person position specifying apparatus 12 by applying the wireless IC tag having the device ID to the device. While the conference is being recorded, the device operation specifying apparatus 15 monitors on and off of the power of a liquid crystal projector and the light. When there is a change in on or off state, the device operation specifying apparatus 15 sends the device name, the state of the device after the change, and the conference room name, to the information management apparatus 20. The information management apparatus 20 acquires the conference ID from the conference room name by using the conference ID list, and stores the conference ID, device ID, device state, and time. The information management apparatus 20 receives the video image, the person ID read from each of the above-mentioned readers, the remark flag, the reader ID of the reader that has been read, and the operation state of the device, and then stores them in the conference DB 30. At this time, the information transmitted from the start to end of the conference recording apparatus 10 is stored as one record.

The conference ID is given to each record to list the start date and time, conference room name, and the conference period. The record stores the information on the elements that compose the conference or the conference room such as the video image, participants, devices or the like, according to a timeline. Specifically, the position of each participant in the conference room or the start time of the remark is stored in association with the time. In addition, with respect to the liquid crystal projector, other devices, or materials installed in the conference room, the installation position and operation (on or off) state thereof are stored in association with the time. In accordance with the present embodiment, the positions of the participants are recognized by the readers embedded in the lattice-shaped segments and the recognition results are stored. Also in accordance with the present embodiment of the present invention, the video image captured by one camera is stored, yet multiple video images may be stored, if multiple cameras are employed.

FIG. 2 is a view showing a data structure in the conference DB 30. Data shown in FIG. 2 is stored in the conference DB 30. The conference DB 30 stores the information on the event occurred in the conference room in association with the document, which was used in the conference room, as a search index. Specifically, the conference DB 30 stores the positional information of objects in the space, the remark state of the person in the space, and the operation state of the device in the space, in association with the document as the event information.

One record is provided for one conference, and the conference ID, date, place, member, device, time are recorded in the first line of the record to identify each conference. In the second line, the URL of the Web is listed as the document information and the document used on the conference is stored in the URL. In this example, three documents are listed and separated by a comma. In the subsequent lines, the operation state is listed as the event information. In the operation state, in every second, the positional information of each participant, the remark state of the participant, the positional information of the device or facilities, and the operation state of the device. For example,

00:00:01|A:132|C:000|G:056|Z:035;

denotes that a participant A made remarks (shown by 1) one second after the conference started, and is located on a position of 3 in X-axis direction and 2 in Y-axis direction, when the room is segmented into rectangular blocks. It shows that a participant C has not participated in the conference yet. A participant G has not made remarks yet (shown by 0), and is located on a position of 5 in X-axis direction and 6 in Y-axis direction. A device Z is turned off (shown by 0), and is located on a position of 3 in X-axis direction and 5 in Y-axis direction.

Figure 3:
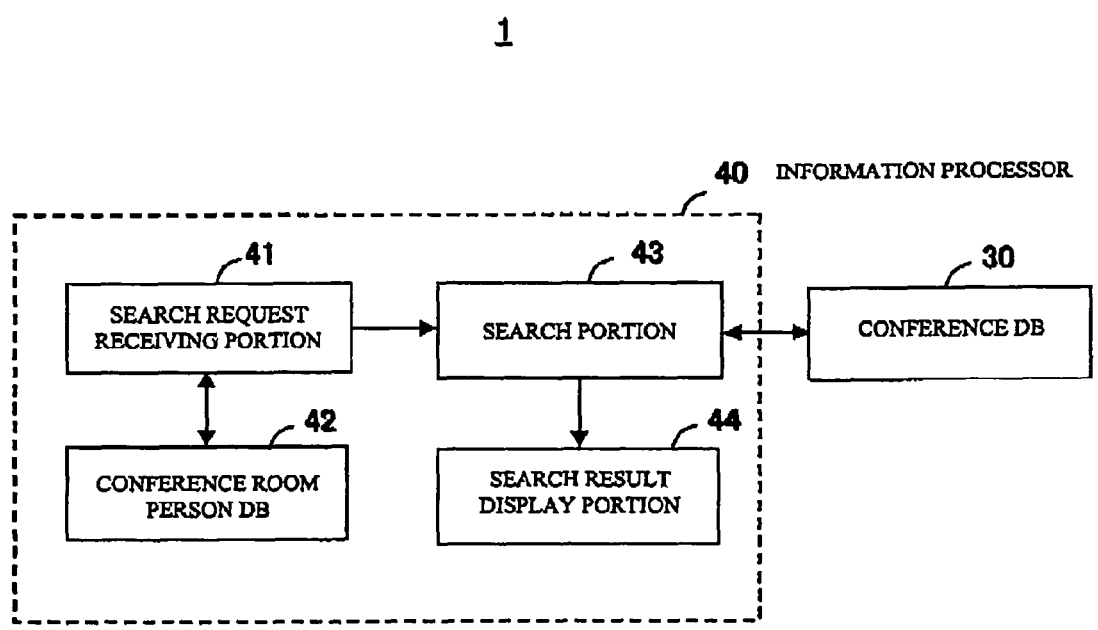
FIG. 3 is a view showing a configuration of an information processor in accordance with an embodiment of the present invention.

FIG. 3 is a view showing a configuration of an information processor 40 in accordance with the present embodiment of the present invention. The information processor 40 includes a search request receiving portion 41, a conference room person DS 42, a search portion 43, and a search result display portion 44. The search request receiving portion 41 is provided for receiving the event information associated with the document as a search request. The search request receiving portion 41 displays a miniature GUI, which is a search screen, on the display device, and receives the event information as the search request, according to the operation on the GUI.

The conference room person DB 42 retains the information on the conference room and the participant. The conference room person DB 42 stores the names of the persons that can be the participants, IDs, photographs of persons' faces, and layout charts of the conference rooms, and is reflected onto GUI of the search request receiving portion 41, as will be described hereafter. The information on the conference room person DB 42 can be input manually. For example, when a new employee is assigned, the name, ID, and photograph thereof are stored in the conference room person DB 42. When a conference room is newly set up, the name of the room and the layout chart thereof are registered in the conference room person DB 42. The search portion 43 searches the conference DB 30 on the basis of the search request received by the search request receiving portion 41. The search result display portion 44 displays a search result obtained from the search portion 43 on the display device. For example, the search result display portion 44 displays the information for accessing the document searched by the search portion 43, on the display device.

Here, a description will be given of an overview of processing on the information processing system 1. The information processing system 1 provides a new technique of searching for a document used in the conference. Specifically, in the information processing system 1, it is possible to restructure a scene in which the document to be searched for was used on a miniature GUI so as to search for the document used in the scene that matches a clue or keyword. The event information of the clue includes the conference room, positions of the participant or objects, who's remarks, the order of the remarks, the device that was used, and the like. During the conference, the afore-mentioned clues are also recorded together with the document used on the conference.

After a certain period has passed since the end of the conference, when a participant likes to search for the document used in this conference, the participant remembers a clue of the scene in which the document was used and gives the clue to the system on the miniature GUI. The miniature GUI is formed as a layout chart of the conference room, and icons of the participants can be freely arranged on the layout chart. For example, assuming that a person A "likes to review materials used in a presentation delivered for the president", and the person A is able to remember the conference room in which the scene occurred, the position where the person A (himself or herself) was sitting, and the position where the president was sitting.

The person A gives things that are remembered to the system as clues. First, the person A remembers the conference room, and gives the conference room name to the system as a clue to obtain the layout chart of the conference room. Next, the person A remembers the position where himself or herself was sitting, and then arranges an icon representing himself or herself on the layout chart. Then, the person A remembers the position where the present was sitting, and then arranges an icon representing the president on the layout chart. The information system 1 reads the arrangement of the icons of the participants from the GUI, and provides the user with the document used in the scene that matches the arrangement. In this manner, the information processing system 1 provides the document that was used in the scene matching to the scene, eliminating the necessity of comparing the context information of multiple conferences. In addition, it is possible to structure the scene with a use of a miniature as a search request, allowing the user to give an instruction in a natural manner such as the positional information or the order of the remarks.

Figure 4:
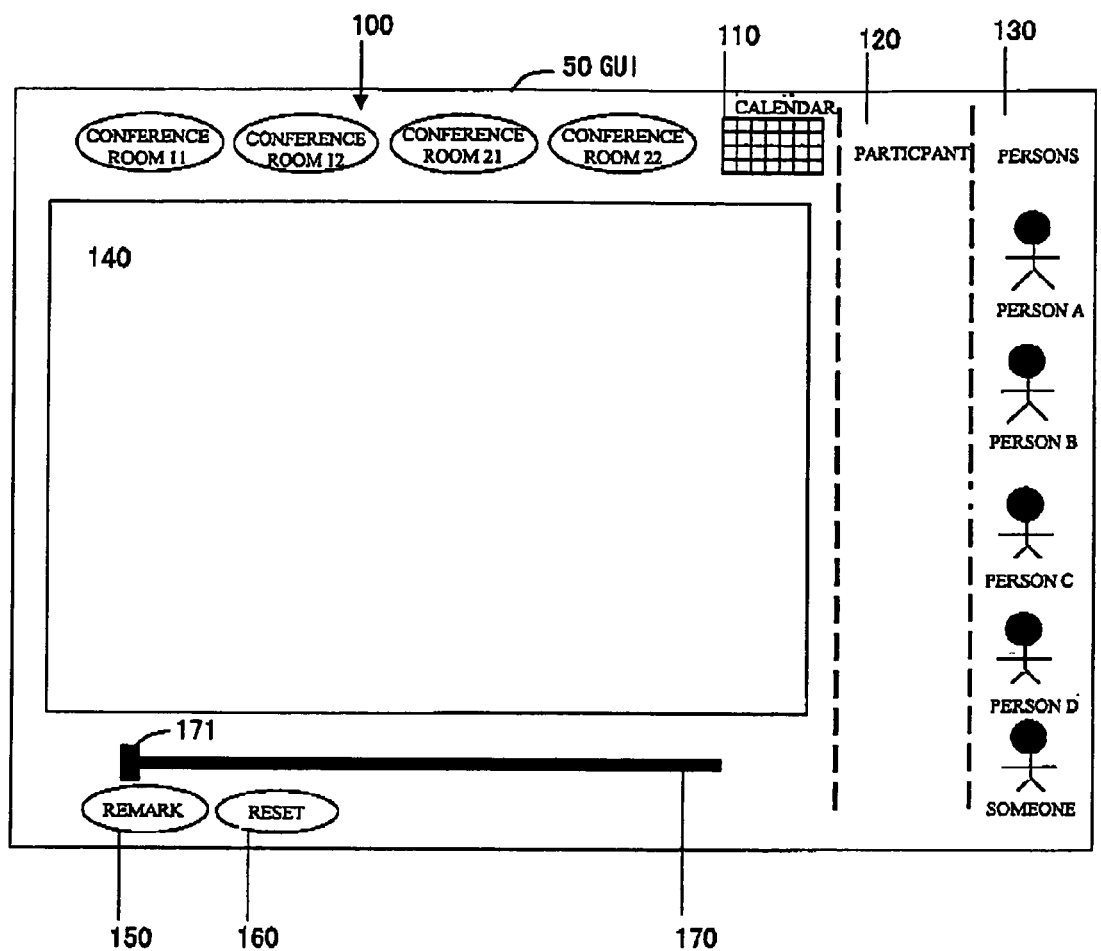
FIG. 4 is a view showing a GUI displayed by a search request receiving portion.

FIG. 4 is a view showing a miniature GUI displayed by the search request receiving portion 41. The search request receiving portion 41 includes a GUI 50 as shown in FIG. 4. The search request receiving portion 41 shows, on the GUI 50, a group of buttons 100, a calendar 110, a participant area 120, a person area 130, a conference room display area 140, a remark button 150, a reset button 160, and a time scroll bar 170. The buttons 100 are provided for selecting the conference room as a portion to select the space. The calendar 110 is provided for selecting the time when the conference was carried out as a portion to select the captured date of the image. The participant area 120 is provided for specifying the participant as the area as a portion to specify the person in the space. The person area 130 displays icons that show persons. The conference room display area 140 is provided as a portion to display the layout chart of the conference room when one of the buttons 100 is selected. The remark button 150 is provided for specifying the remark state of the person as a portion to specify the remark state. The reset button 160 is provided for returning the GUI to an initial state. The time scroll bar 170 is provided for specifying the elapsed time of the conference.

The layouts of the conference rooms may be formed into the thumbnails to be used for the buttons 100. This makes it possible to select the room with reference to not only the room name but also the layout thereof. The person area 130 displays person icons A through D that represent the individuals. The photographs of the persons' faces may be displayed on the icons A through D. The names of the individuals are given below the persons' icons A through D. The person's icon having the name of "someone" is an icon that does not specify a particular person. When the user manipulates the person's icon on the GUI 50, the search request receiving portion 41 issues the manipulation as a search query.

Figure 5:
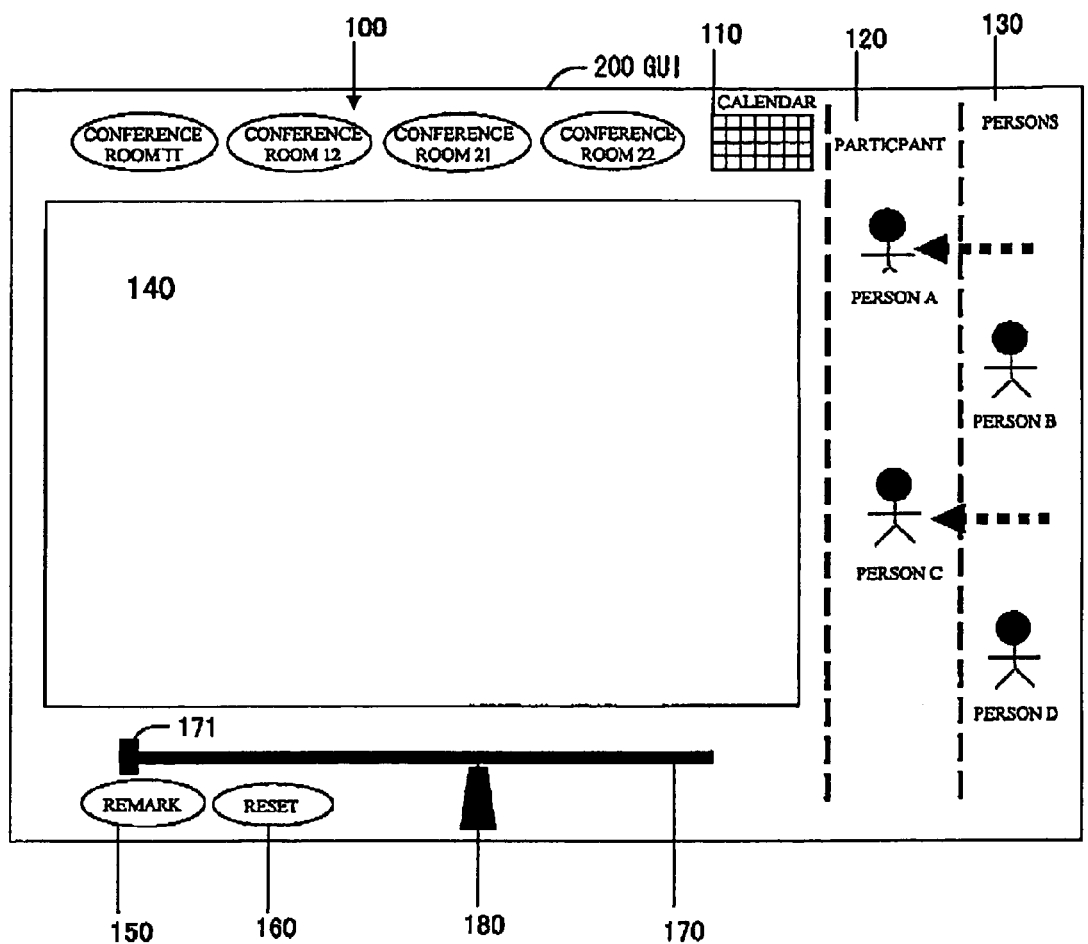
FIG. 5 is a view showing another GUI displayed by a search request receiving portion.
Figure 6:
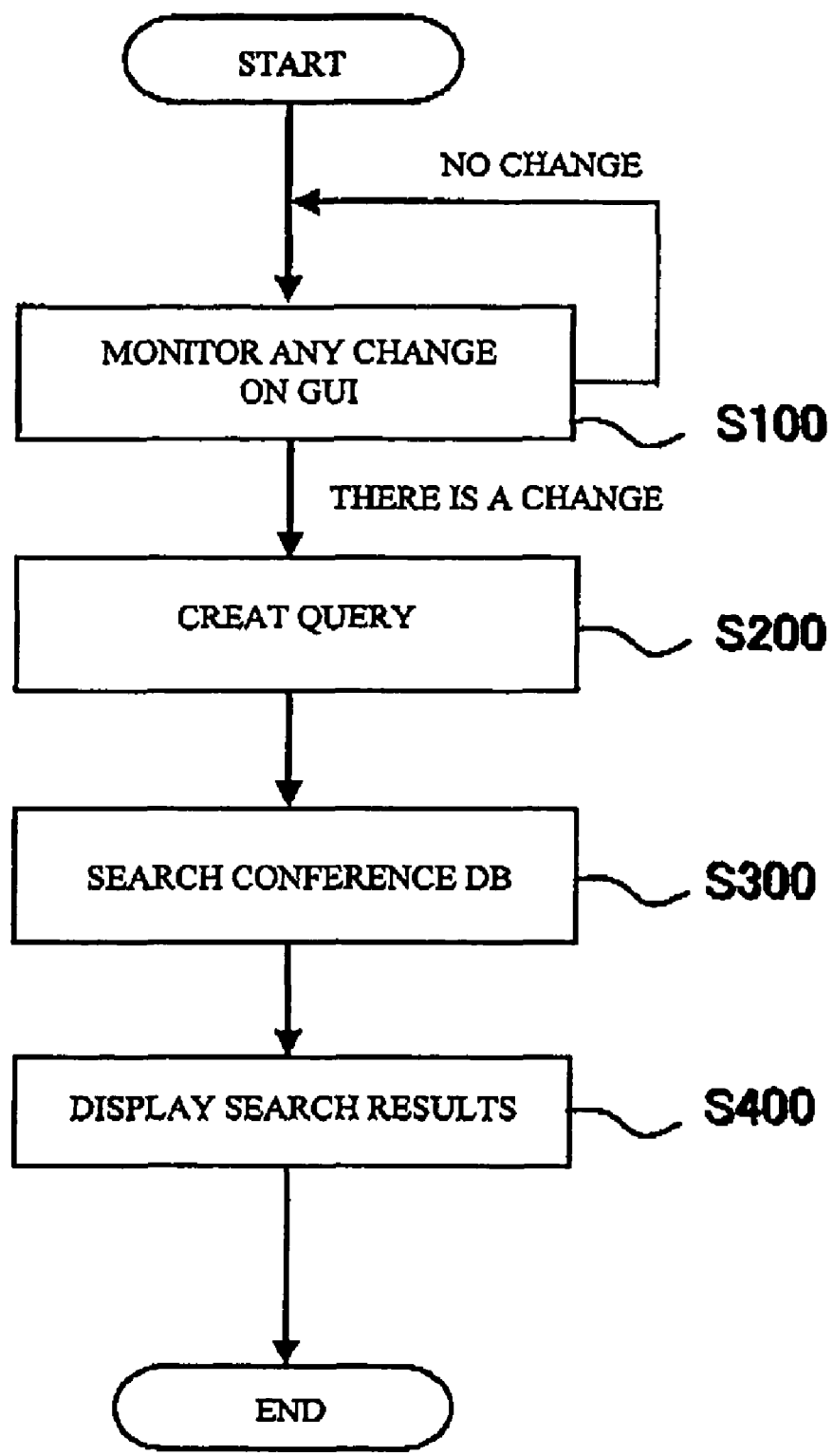
FIG. 6 is a flowchart showing a whole process of the information processor.
Figure 7:
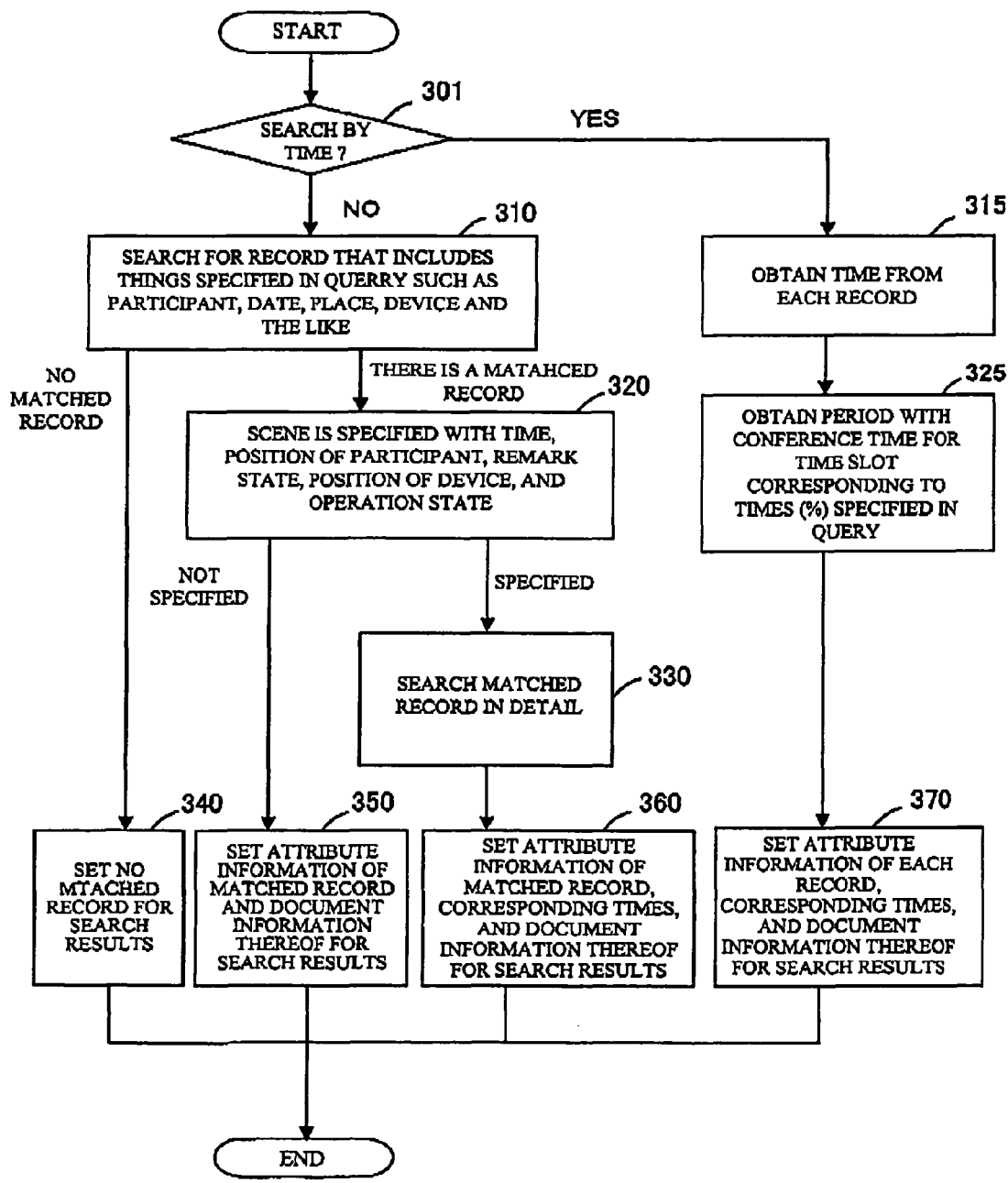
FIG. 7 is a flowchart showing a whole process of a search portion.

A description will now be given of a procedure of the search process on the information processor 40. FIG. 5 is view showing a GUI 200 provided by the search request receiving portion 41. FIG. 6 is a flowchart showing a whole process of the information processor 40 in accordance with the present embodiment of the present invention. FIG. 7 is a flowchart showing a whole process of the search portion 43 in accordance with the present embodiment of the present invention. As the clues of the scene to be searched for, for example, it is possible to use the following cases.

The participant can be specified
The conference room can be specified
The date and time can be specified
The speaker can be specified
The position of the participant can be specified
The temporal position can be specified Here, as a search example, the document used in the conference in which the person A and a person C took part is searched for. As shown in FIG. 5, icons of the person A and the person C are moved to the participant area 120 from the person area. The search request receiving portion 41 monitors any change on the GUI 200 (step S100 in FIG. 6). Whenever there is a change, the search request receiving portion 41 issues a search request (step 5200 in FIG. 6). The search request, which is issued in the state where the icons of the persons A and C are moved to the participant area 120, is described as follows.

Search query: participants: person A, person C

The search portion 43 receives the search request and searches the conference DB 30 (step S300 in FIG. 6). The search portion 43 searches for a record that includes the things specified by the query such as the participant, date, place, device, and the like (step S310 in FIG. 7). Here, the search portion 43 searches for a record that includes the person A and the person C in a member field of the first line of each record in the conference DB 30. In this case, the record having an ID of 0016 is matched. Next, if there is a matched record, the search portion 43 checks whether the time, the position of the participant, the remark state, the position of the device, and the operation state of the device are specified by the scene (step S320). Here, the search portion 43 specifies only the participant in this query, and does not specify the position or remark. This means that the detailed search is not implemented in each conference, because the position or remark is not specified.

The search portion 43 sets attribute information and document information of the matched record for search results (step S350). Here, the search portion 43 checks the first line and the document field of the matched ID and obtains the link of the document listed therein. Next, the search portion 43 transmits the first line and the link of the document that have been obtained to the search result display portion 44. The search result display portion 44 receives the conference ID, date, place, participant, device, period, and link of the document, and displays to the user as shown in FIG. 8 (step S400 in FIG. 6).

Figure 8:
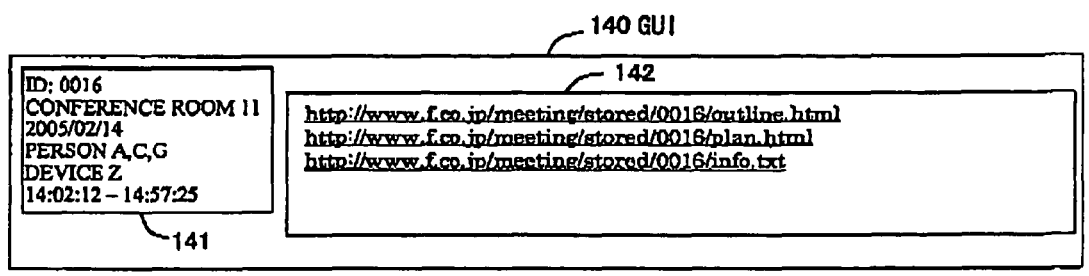
FIG. 8 is a view showing a GUI displayed by a search result display portion.
Figure 9:
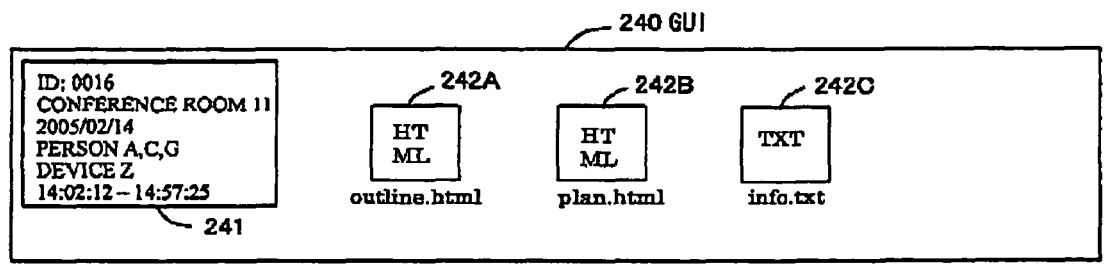
FIG. 9 is a view showing another GUI displayed by a search result display portion.

FIG. 8 is a view showing a GUI 140 provided by the search result display portion 44. In FIG. 8, a reference numeral 141 represents an attribute information display area, and a reference numeral 142 represents a document link area. The user is able to click the link of the document to access the document registered on the Web. FIG. 9 is a view showing another example of the GUI provided by the search result display portion 44. A reference numeral 241 represents the attribute information. As shown in FIG. 9, a GUI 240 may obtain the document type with the extension of the document to display icons 242A through 242C that correspond thereto, or may access the document actually to create a thumbnail of the beginning portion of the document, instead of displaying the link name itself. Each page may be formed into the thumbnail, if there is a concept of page such as a slide document. In this case, it is possible to access the document by clicking the icons 242A through 242C or the thumbnail.

Figure 10:
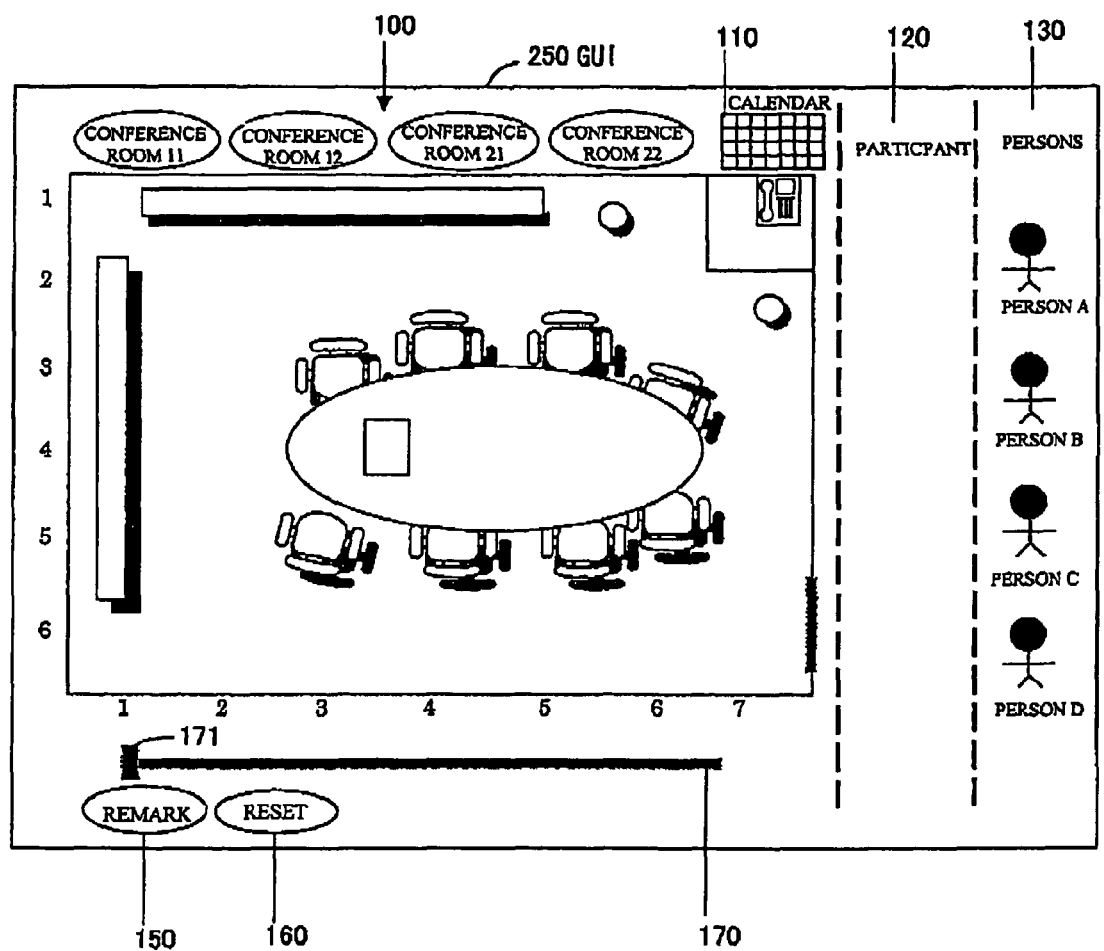
FIG. 10 is a view showing yet another GUI displayed by a search request receiving portion.
Figure 11:
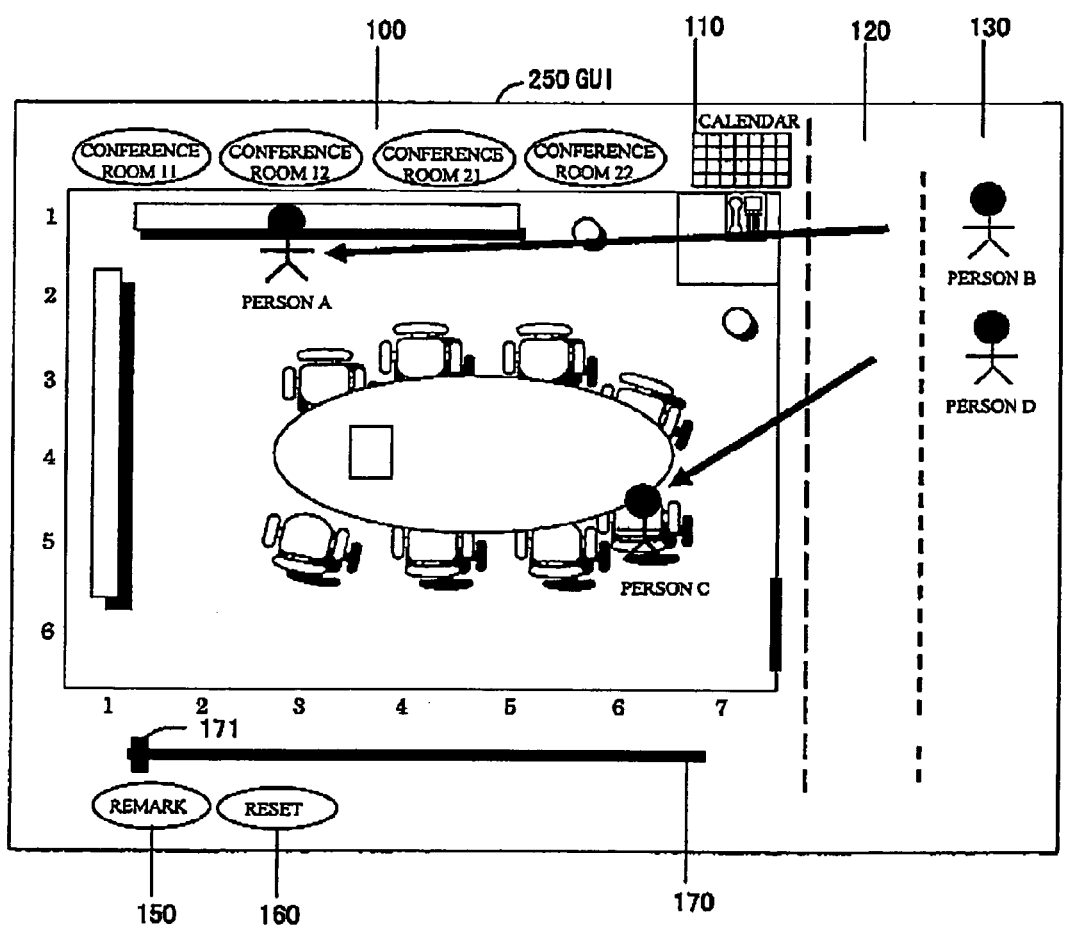
FIG. 11 is a view showing a GUI where icons of a person A and a person C are arranged.

Next, a description will be given of an example of searching for a document by specifying the conference room. FIG. 10 is a view showing a GUI 250 provided by the search request receiving portion 41. FIG. 11 is a view showing the GUI 250 where the icons of the person A and the person C are arranged. Here, the search request receiving portion 41 provides the layout chart of the space on the GUI 250, and in addition, receives the search request in a format in which portions that indicate the positions of persons and devices, which are objects in the space, are arranged on the layout chart of the space. The icons of the persons are portions that indicate the positions of the objects in the space.

When the user is able to specify the conference room that was used in searching for a document, the buttons 100 are pushed. Then, the search result display portion 44 displays the layout of the conference room (the layout chart of the space) specified in conference room display area 140. At this time, the search request receiving portion 41 issues the following search request.

Search query: conference room; conference zoom 12

The search portion 43 receives this request and searches the conference being held in the conference room 12 (step S300 in FIG. 6). The search portion 43 searches for a record that includes the things specified by the query such as the participant, date, place, device, and the like (step S310). The search portion 43 searches each record for a record that includes the conference room 12 in a place field of the first line in the record. In this case, the record having the ID of 0015 is matched.

Next, the search portion 43 checks whether the time, position of the participant, remark state, position of the device, operation state are specified by the scene (step S320). Here, the search portion 43 specifies the conference room only in this query, and does not search each conference room in detail, because the position or remark is not specified. The search portion 43 sets attribute information and document information of the matched record for search results (step S350). Here, the search portion 43 checks the first line and the document field of the matched ID and obtains the link of the document listed therein. Next, the search portion 43 transmits the first line and the link of the document that have been obtained to the search result display portion 44. The search result display portion 44 displays the link, icons, or thumbnail of the document that has been searched for, together with the conference information such as the conference ID, conference room, date, participant, period (step S400 in FIG. 6).

Next, a description will be given of an example of searching for a document by specifying the date. If the user is able to specify the date in searching for a document, a marking is applied to the corresponding date on the calendar 110. The marking is applied by clicking or dragging the date by mouse. For example, if markings are applied to Feb. 9, 2005, Feb. 10, 2005, and Feb. 11, 2005, the search request receiving portion 41 issues the following search request.

Search query: date: Feb. 9, 2005, Feb. 10, 2005, and Feb. 11, 2005

The search portion 43 receives this search request and searches the conference DB 30 for the conference that was held on the afore-mentioned date. The search portion 43 searches for a record that includes the things specified by the query such as the participant, date, place, device, and the like (step S310). Here, the search portion 43 searches each record for a record that includes the corresponding date in the place field of the first line in each record. In this case, the record having the ID of 0014 is matched. Here, the search portion 43 checks whether the time, position of the participant, remark state, position of the device, operation state are specified by the scene (step S320). Here, the search portion 43 specifies the date only in this query, and does not search each conference in detail, because the position or remark is not specified.

The search portion 43 sets attribute information and document information of the matched record for search results (step S350). Here, the search portion 43 checks the first line and the document field of the matched ID and obtains the link of the document listed therein. Next, the search portion 43 transmits the first line and the link of the document that have been obtained to the search result display portion 44. The search result display portion 44 displays the link, icons, or thumbnail of the document that has been searched for, together with the conference information such as the conference ID, conference room, date, participant, period (step S400 in FIG. 6).

If the user is able to specify the position of the participant, the user selects the conference room with the conference room select buttons 100 in the conference room select area. Then, the search request receiving portion 41 accesses the conference room person DB 42, and displays a plain view of the conference room on the conference room display area 140. In this example, the conference room 12 is selected. Referring to FIG. 11, the searcher remembers the position where the person A was sitting and the position where the person C was standing, and arranges the person icons on the corresponding positions by mouse. At this time, the search request receiving portion 41 issues the following search request.

Search query: conference room: conference room 12
participant: person A, person C
position: person A: X=3, Y=1,
    person C: X=6, Y=5

Figure 12:
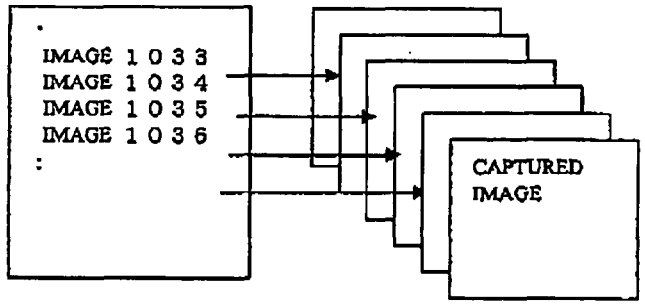
FIG. 12 is a view showing another data structure of the conference DB.

The search portion 43 receives this search request and searches the conference DB 30. FIG. 12 is a view showing a data structure of the conference DB 30 to be searched. The conference DB 30 shown in FIG. 12 is different from that shown in FIG. 2 in that the page of the document or title of the slide is given in each second. The image of each page or slide is obtained whenever the page or the slide is viewed, and an image ID is give to the image. The image ID is provided for a time slot while the image is being viewed in each record. The image that has been obtained is stored in the conference DB 30.

These images may be obtained by manually capturing the image displayed on the screen to give an image ID to the image and input the image ID into the time slot while the screen is being displayed. If the images are obtained automatically, the timing of the slide change may be obtained to capture the image of the changed slide in each time. When viewing the Web, the Web document being displayed may be captured to obtain the image thereof, whenever there is a transition on the Web, for example, whenever the URL being referred to is changed. When viewing the document on the Web, the URL itself may be input instead of the captured image.

The record having a conference ID 0019 shown in FIG. 12 shows that the slide having an image ID 1034 was displayed from the fourth second to sixth second after the start of the conference. The slide was changed at the seventh second to the slide having an image ID 1035. The search portion 43 searches for a record that includes the things specified by the query such as the participant, date, place, device, and the like (step S310). Here, the search portion 43 receives this search request to search for the conference in which the persons A and C took part. In searching the conference DB 30 shown in FIG. 12, the search portion 43 searches for a record that includes the corresponding persons A and C in the place field of the first line of each record. In this case, the record having the ID of 0019 is marched.

The search portion 43 searches the matched record in detail (step S330). Here, the search portion 43 implements the detailed search in the conference information, because the query specifies the positions of the participants. The search portion 43 searches for a line that matches the conditions, because the position of the person A is specified on X=3 and Y=1, and the position of the person C is specified on X=6 and Y=5. In the conference DB 30 shown in FIG. 12, the record of ID 0019 is matched and the operation state of
00:00:07|A:031|C:065|G:044|Z:135|image 1035;
is matched.

The search portion 43 acquires the image ID 1035 described in the end of the matched line. The search portion 43 further searches the conference DB 30 for the image shown by the image ID 1035, and obtains it. The search portion 43 obtains the first line of the matched ID. Then, the search portion 43 sets the attribute information of the record, the corresponding time, and the document information of the corresponding time for search results (step S360). Here, the search portion 43 transmits the first line and the image that have been acquired to the search result display portion 44. The search result display portion 44, in the same manner, creates the thumbnail of the image of the document that has been searched for, and displays the thumbnail together with the conference information such as the conference ID, the conference room, date, participant, and period (step S400 in FIG. 6). Original data of the image is stored. When the user clicks the thumbnail, the search result display portion 44 displays the original data of the thumbnail. As described heretofore, it is possible to search for each document used in the conference by specifying the position of the participant, because the document is stored in association with the position of the participant while the document was being viewed.

Figure 13:
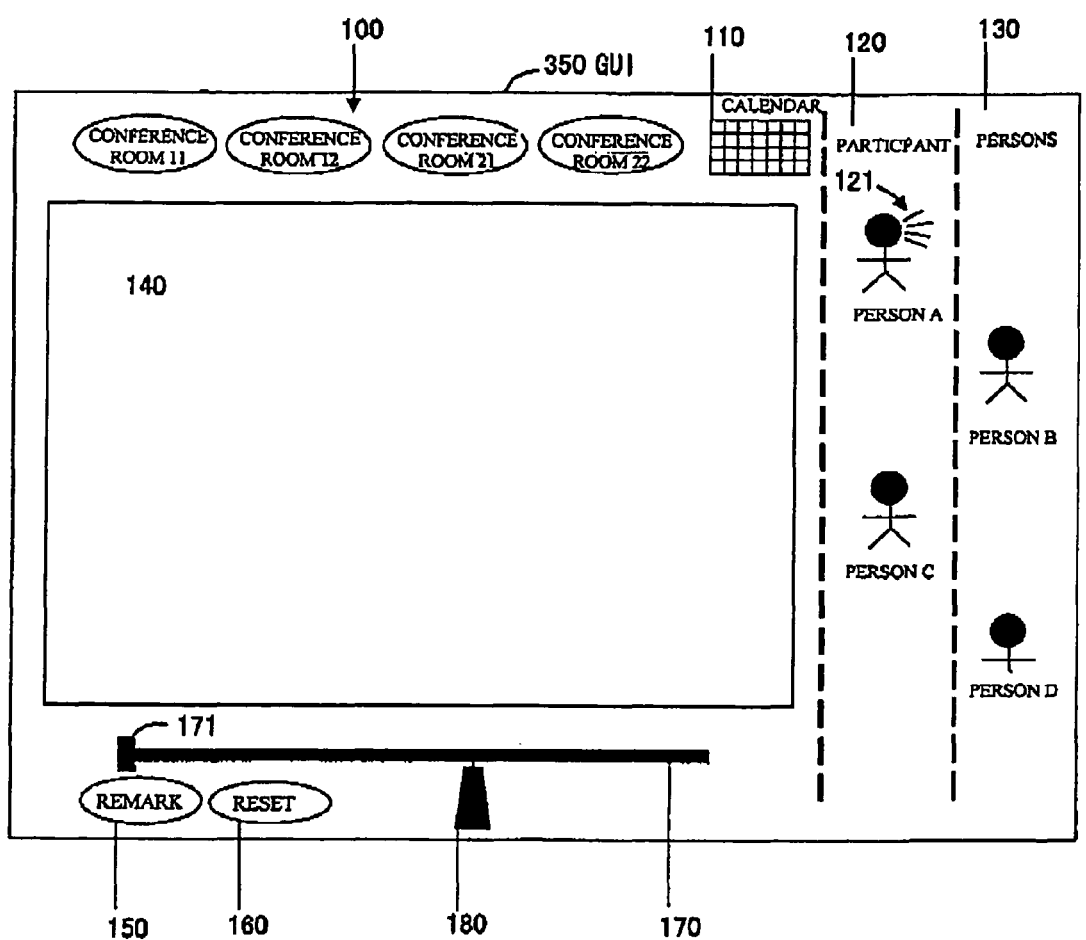
FIG. 13 is a view showing yet another GUI displayed by a search request receiving portion.

Next, a description will be given of a case where the participant can be specified. FIG. 13 is a view showing a GUI 350 provided by the search request receiving portion 41. If the remark state of the participant can be specified, the speaker is specified as shown in FIG. 13. FIG. 13 denotes that the person A is making a remark. In specifying the remark state, the remark button 150 is pushed once and then the person A is clicked. This makes it possible to search for a document used while the person A was making a remark. The search request receiving portion 41 issues the following search request.

Search query: participant; person A, person C
speaker: person A

The search portion 43 searches for a record that includes the things specified by the query such as the participant, date, place, device, and the like (step S310). Here, the search portion 43 receives the search request from the search request receiving portion 41, and searches for the conference in which the persons A and C took part. In searching the conference DB 30 shown in FIG. 12, the search portion 43 searches for a record that includes the persons A and C in the place field of the first line of each record. In this case, the record having the ID of 0019 is matched. The search portion 43 searches the matched record in detail (step S330). Here, the search portion 43 searches the conference information in detail, because the query specifies the remark of the participant. In this example, the search portion 43 checks the remark state of the person A in the matched record. Specifically, the search portion 43 searches the following lines.
00:00:00|A:132|C:066|G:000|Z:035;
00:00:01|A:132|C:066|G:056|Z:035;
00:00:04|A:132|C:065|G:055|Z:035|image 1034;
00:00:05|A:132|C:065|G:055|Z:035|image 1034;

Subsequently, the search portion 43 acquires the image ID listed in the end of the searched line. In this case, the search portion does not acquire anything from the first two lines, because there is no image list. The search portion 43 acquires the image ID 1034 from the subsequent two lines. In this case, the search portion 43 acquires only the image ID 1034, because the image IDs are identical. The search portion 43 further requests the conference DB 30 for the image shown by the image ID 1034 and acquires it. The search portion 43 sets the attribute information of the record, the corresponding time, and the document information of the corresponding time for search results (step S360). Here, the search portion 43 transmits the first line and the image that have been acquired to the search result display portion 44.

The search result display portion 44, in the same manner, creates the thumbnail of the image of the document that has been searched for, and displays the thumbnail together with the conference information such as the conference ID, the conference room, date, participant, and period (step S400 in FIG. 6). Original data of the image is stored. When the user clicks the thumbnail, the search result display portion 44 displays the original data of the thumbnail.

Figure 14:
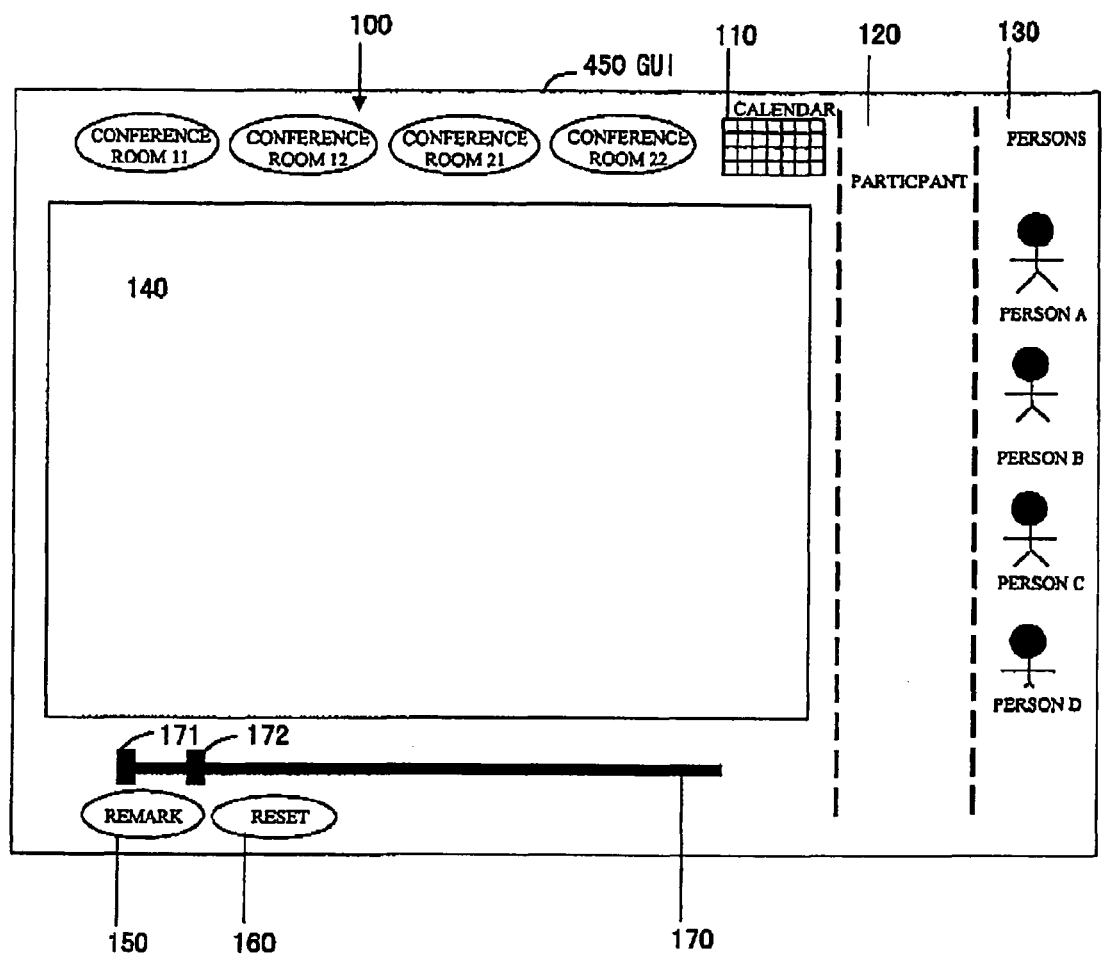
FIG. 14 is a view showing yet another GUI displayed by a search request receiving portion.

Next example is an example of searching for a document by specifying the elapsed time of the conference. FIG. 14 is a view showing a GUI 450 provided by the search request receiving portion 41. In searching for a document, if it is possible for the user to specify the document how long the time had passed from the start when the document was used in the conference, the time can be specified by using the positions of the knobs 171 and 172 on the time scroll bar 170. A left end of the time scroll bar 170 represents an elapsed time of 0% (start) and a right end thereof represents the elapsed time of 100% (end). For example, in searching for a material that was viewed immediately after the start of the conference, the two knobs 171 and 172 are set as shown in FIG. 14. The search portion 43 issues the following search request.

Search query: elapsed time: 0-10%

The search portion 43 receives this search request, and searches for a document shown in 0-10% of a conference period from the start of the conference (step S301). The search portion 43 acquires the time field of the first line of the record, in searching the conference DB shown in FIG. 16 (step S315). For instance, in the conference having the ID 0019,
11:06:42-12.07943
is obtained.

The search portion 43 obtains the conference period from the afore-mentioned times of the conference, obtains a time slot that corresponds to the times (%) specified in the query (step S325), and sets the attribute information of each record, the corresponding times, and the document information thereof for the search results (step S370). Specifically, first, the search portion 43 obtains the conference period with the times of the conference. In this case, 3,661 seconds is obtained. The search portion 43 calculates the time from 0% to 10%, from the start of the conference. In this case, this corresponds to 0 to 366 seconds. In this manner, the search portion 43 acquires the times from 0% to 10% from all the records.

Next, the search portion 43 searches for the document that was viewed in the time slot that corresponds to the times calculated. In the conference having the ID 0019, the images ID 1034 and ID 1035 are searched. The search portion 43 further requests the conference DB 30 for the images shown by the image ID 1034 and ID 1035, and obtains the images. The search portion 43 acquires the first line of the matched ID. Then, the search portion 43 transmits the first line and the images that have been obtained to the search result display portion 44. The search result display portion 44, in the same manner, creates the thumbnails of the images and displays them together with the conference information such as the conference ID, conference room, date, place, participant, and period (step S400 in FIG. 6). The original data of the image is stored. When the user clicks the thumbnail, the search result display portion 44 displays the original data of the thumbnail.

Figure 15:
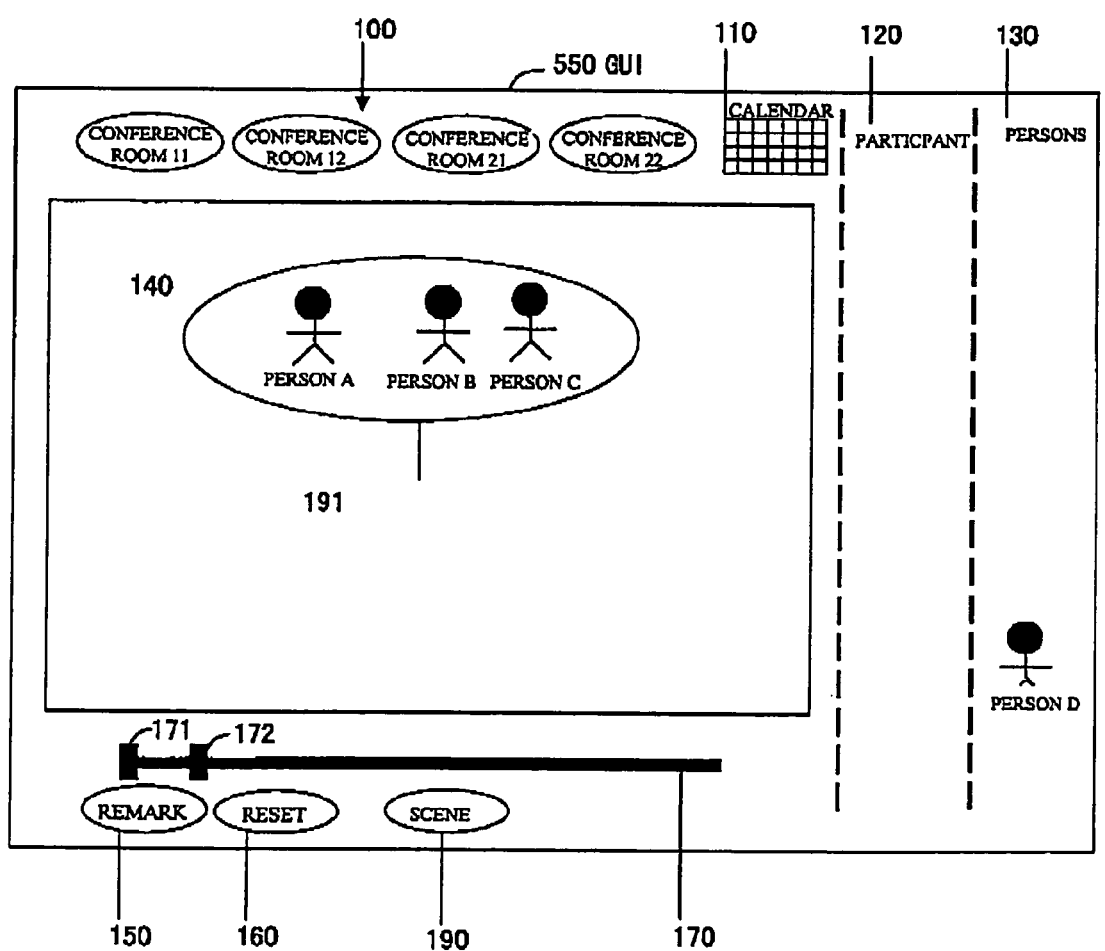
FIG. 15 is a view showing yet another GUI displayed by a search request receiving portion.

The next example is an example of searching for a document by constructing a fragmentary scene with someone who was also attending the conference and objects, even if the layout of the conference room cannot be remembered. FIG. 15 is a view showing a GUI 550 provided by the search request receiving portion 41. Here, the search request receiving portion 41 receives the search request in a format in which portions that indicate information of an event are arranged in a scene area 191, which is a given area. The person icons are the portions that indicate the event information.

In FIG. 15, a scene button 190 is added, which is different from the above-described GUIs. Assuming that in searching for a document, the user still remembers that a person B and the person C were existent in proximity the user (the person A), although the user cannot remember the name of the conference room or the layout thereof when the document was used. As shown in FIG. 15, the search request receiving portion 41 creates the scene area 191, when the scene button 190 is pushed. The user sequentially drags and drops the icons of the persons A, B, and C to the scene area 191. The search request receiving portion 41 issues the following search request.

Search query: scene 1: person A, person B, person C

The search portion 43 receives this request, and searches for the document that was used in the conference in which the persons A, B, and C took part and were existent in proximity. FIG. 16 is a view showing a data structure of the conference DB 30 at this time. The search portion 43 searches for a record that includes the things specified by the query such as the participant, date, place, device, and the like (step S310). Here, the search portion 43 searches for a record that includes the persons A, B, and C included in the search request. In this case, the record having an ID 0022 is matched. At this time, the search portion 43 checks for matching the participants and devices included in the search request and those included in each conference record. The search portion 43 obtains the conference ID that is matched as a result. For example, here, the scene 1 specifies the persons A, 3, and C. Therefore, the search portion 43 searches for a conference that includes them as participants. Here, the conference having the conference ID 0022 is searched.

Figure 18:
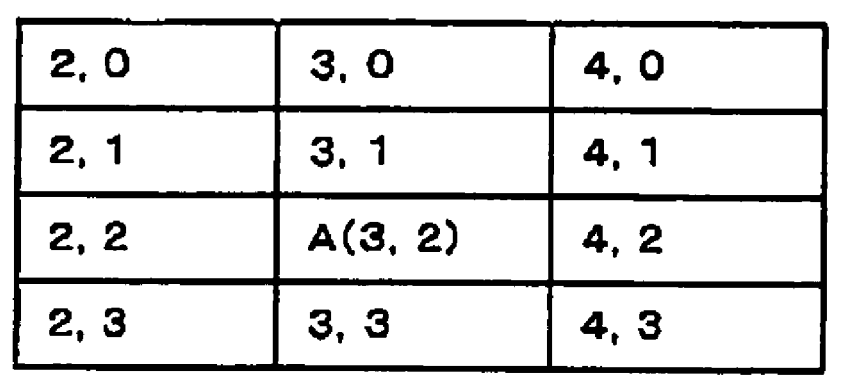

FIG. 17 and FIG. 18 are views illustrating a proximity determination made by the search portion 43. The search portion 43 determines whether the specified participants are existent in adjacent blocks in each second, if multiple participants are specified. First, the search portion 43 searches the operation field in the record having the matched conference ID whether the specified participants are existent in adjacent blocks. The search portion 43 implements following processes in each time of the record having the matched conference ID.

(1) The search portion 43 obtains the positional information of a first participant (or device), and further obtains adjacent blocks on the basis of the positional information that has been obtained. In this example, the search portion 43 acquires the positional information of the person A. For example, if the person A exists on (X, Y)=(3, 2) at 00:00:05 second, all the blocks having values of X+−1 and Y+−1 are obtained. In this case, the search portion 43 is capable of obtaining 8 adjacent blocks of (3, 2), which are (2, 1), (3, 1), (4, 1), (2, 2), (4, 2), (2, 3), (3, 3), and (4, 3).

(2) Subsequently, the search portion 43 determines whether one of the adjacent blocks includes another participant that has been specified. If another participant is included in one of the adjacent blocks, the search portion 43 adds adjacent blocks of the block having the afore-mentioned another participant to the original adjacent blocks. Here, the search portion 43 determines whether there is another participant in one of the adjacent blocks of the block where the person A is existent. At 00:00:00 second, the person B or person C is not included in the adjacent blocks of the block where the person A is existent. The search portion 43 goes back to (1), if any one of other participants is not included in the adjacent blocks of the block where the person A is existent. At 00:00:01 second, the person C is existent in (3, 1) and included in one of the adjacent blocks.

The search portion 43, as shown in FIG. 1, acquires adjacent blocks of the block where the person C is existent, and adds the adjacent blocks to the original adjacent blocks. Further, the search portion 43 checks whether another participant is included in the added blocks shown in FIG. 18, In this case, the person B is not included, because the person B is existent at (0, 0) and does not attend the conference. If no participant is included in the adjacent blocks, the search portion 43 goes back to (1) and implements the process for the next second. At 00:00:04, the person B and the person C are included in the adjacent blocks of the block where the person A is existent. The search portion 43 implements the processes (1) and (2) for all the seconds. The search portion 43 completes the determination in all the seconds, and then obtains the first line and a link of the document listed in the document field of the matched ID. Then, the search portion 43 transmits the first line and the link of the document that have been obtained to the search result display portion 44.

As another example, when the document or slide that was used is managed and controlled in each second on the conference DB 30, as shown in FIG. 12, an image ID of the corresponding time slot in the matched conference ID is obtained and transmitted to the search result display portion 44. The search result display portion 44, in the same manner, displays the link of the document, icon, or thumbnail of the document that has been searched for together with the conference information such as the conference ID, conference room, date, participant, and period, (step S400 in FIG. 6).

In all examples described heretofore, the search examples have been described with the use of each clue, yet the search clues may be specified together. For instance, it can be considered that the position of the participant is specified, the speaker is specified, and the date is specified. In this manner, if multiple clues are specified, the search portion 43 implements AND search to satisfy all conditions. In this case, the search portion 43 searches for a record of the conference that was held on the specified date, and further searches for a line that includes the specified participant existent on the specified position and be in the state of remark. Then, if the image ID is listed in the end of the line, the search portion 43 acquires the image that corresponds to the image ID and the image ID may be sent to the search result display portion 44.

In addition to the above-described explanation, the device may be used for searching instead of the participant. The devices and facilities are specified by the above-described device position specifying apparatus 13 and stored on the conference DE 30 by the information management apparatus 20. Instead of recording the remarks, the power states of the devices are specified by the device operation specifying apparatus 15 and stored on the conference DB 30 by the information management apparatus 20.

In accordance with the embodiments described heretofore, the conference room has been described as an example of the space, yet the present invention is not limited to this. Various types of space may be included. The conference DB 30 and the information processor 40 may implement the above-mentioned processes for the user being connected via the network. In addition, as an example of the search portion that searches for an event, FIG. 1 shows the person position specifying apparatus 12, the device position specifying apparatus 13, the speaker recognition apparatus 14, and the device operation specifying apparatus 15, yet the present invention is not limited to them. The present invention may be applied to anything that detects the event that occurs in the space. Further, an image processing technique or sound recognition technique may be employed for specifying the objects such as the person, device, and the like.

In accordance with the above-described embodiments, with respect to the person position specifying apparatus 12 and the device position specifying apparatus 13, a description has been give to the technique of applying the wireless tags to moving objects so that the readers embedded on the wall or floor in advance can catch electric waves and estimate the positions of the tags. However, for example, the tags that emit ultrasonic waves may be applied to the moving objects so that the readers embedded on the wall or floor in advance can catch the ultrasonic waves and estimate the positions of the tags according to the propagation of the tags. A microphone array may be used for specifying the position of the speaker. Moreover, the device operation specifying apparatus 15 may monitor the operation state of the device, by monitoring the change in voltage. Here, with respect to the event information associated with the document may be input manually or the event may be monitored by various sensors or software.

In accordance with the above-mentioned embodiments, the description has been given of the search result display portion 44, which displays the search result on the display device, yet the present invention is not limited to this. The search result of the search portion 43 may be printed out on a paper with the use of a printer, or may be delivered to the user by e-mail. In accordance with the above-described embodiments, the icon of the person has been described as an example of the portion that indicates the event information and the position of the object in the space, yet the present invention is not limited to this. The icon that indicates the device or equipment included in the space may be used.

The information processing method of the present invention is realized by the information processing system 1 or the information processor 40. The information processor 40 is realized by use of a CPU (Central Processing Unit), ROM (Read Only Memory), RAM (Random Access Memory), or the like. The steps of the information processing method are implemented when CPU executes a given program.

In the above-mentioned information processing system, the detection portion may detect, as the event, at least one of a change in a position of an object existent in the given space, a remark state of a person when the object is the person, and an operation state of a device when the object is the device. When a person enters the given space, the person is detected as a change in the position of the object existent in the space. In accordance with the present invention, the user is able to obtain the desired document, by recalling at least one of the type of the object existent in the space, the position of the object existent in the space, the remark state of the person when the object is a person, and the operation state of the device when the object is a device.

In the information processing system, the search request may be received in a format where a first portion indicating the information of the event is provided in a given area. The receiving portion may provide a layout chart of the given space on a search screen and receives the search request in a format where a second portion indicating a position of an object in the given space is arranged on the layout chart of the given space. The memory portion stores at least one of positional information of an object in the given space, a remark state of a person in the given space, and an operation state of a device in the given space, in association with the document as the information of the event; and the receiving portion may receive the information of the event associated with the document as the search request. The receiving portion may provide on a search screen, at least one of a third portion selecting the given space, a fourth portion selecting a captured date of an image, a first area specifying a person in the given space, a second area specifying the document, a third area displaying a layout chart of the given space, and a fifth portion specifying a remark state of the person, and receives the search request according to an operation on the search screen. The user has only to arrange at least one of the afore-mentioned portions in a given area, enabling to support the user to recall the situation.

In accordance with the present invention, it is possible to provide an information system and information processing method, which can search for a document, even if the user cannot remember the content of the document precisely.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-236177 filed on Aug. 16, 2005 including specification, claims, drawings, and abstract is incorporated herein by reference in its entirety.

What is claimed is:

1. An information processing system comprising:
   a memory that stores an event in association with a document which is provided by a computer and is used in a conference, the event including at least one of positional information of a device in the conference, a remark state of a person in the conference, and an operation state of the device in the conference;
   a receiving portion that receives a search request including the event; and
   a search portion that searches the document which is used in the conference by searching the memory on the basis of the event included in the search request received by the receiving portion, wherein
   the remark state of a person in the conference includes a time after start of the conference that the person in the conference makes a remark,
   the operation state of a device in the conference includes information as to whether the device in the conference is turned ON of OFF, and
   the event includes positional information of a device in the conference, a remark state of a person in the conference, and an operation state of the device in the conference.

2. The information processing system according to claim 1, wherein the search request is received in a format where a first portion indicating information on the event is provided in a given area.

3. The information processing system according to claim 1, wherein the receiving portion provides a layout chart of a given space on a search screen and receives the search request in a format where a second portion indicating the position of the device in the given space is arranged on the layout chart of the given space.

4. The information processing system according to claim 1, wherein the receiving portion provides on a search screen, at least one of a third portion selecting a given space, a fourth portion selecting a captured date of an image, a first area specifying the person in the given space, a second area specifying the document, a third area displaying a layout chart of the given space, and a fifth portion specifying the remark state of the person, and receives the search request according to an operation on the search screen.

5. The information processing system according to claim 1, further comprising a display portion that displays information for accessing the document searched for by the search portion.

6. An information processing method comprising:
   receiving a search request including an event, the event including at least one of positional information of a device in a conference, a remark state of a person in the conference, and an operation state of the device in the conference;
   searching a document which is used in the conference by searching a memory on the basis of the event included in the search request received from the memory in which the document is stored in association with the event; and
   displaying a search result, wherein
   the remark state of the person in the conference includes a time after start of the conference that the person in the conference makes a remark,
   the operation state of the device in the conference includes information as to whether the device in the conference is turned ON of OFF,
   the event includes positional information of a device in the conference, a remark state of a person in the conference, and an operation state of the device in the conference, and
   the method is performed by a processor.

7. The information processing method according to claim 6, wherein the step of receiving receives the search request in a format where a first portion indicating information on the event is provided in a given area.

8. The information processing method according to claim 6, wherein the receiving comprises providing a layout chart of a given space on a search screen and receiving the search request in a format where a second portion indicating a position of the device in the given space is arranged on the layout chart of the given space.

9. The information processing method according to claim 6, further comprising:
   providing on a search screen, at least one of a third portion selecting a given space, a fourth portion selecting a captured date of an image, a first area specifying the person in the given space, a second area specifying the document, a third area displaying a layout chart of the given space, and a fifth portion specifying the remark state of the person; and
   receiving the search request according to an operation on the search screen.

* * * * *